Figure 8:
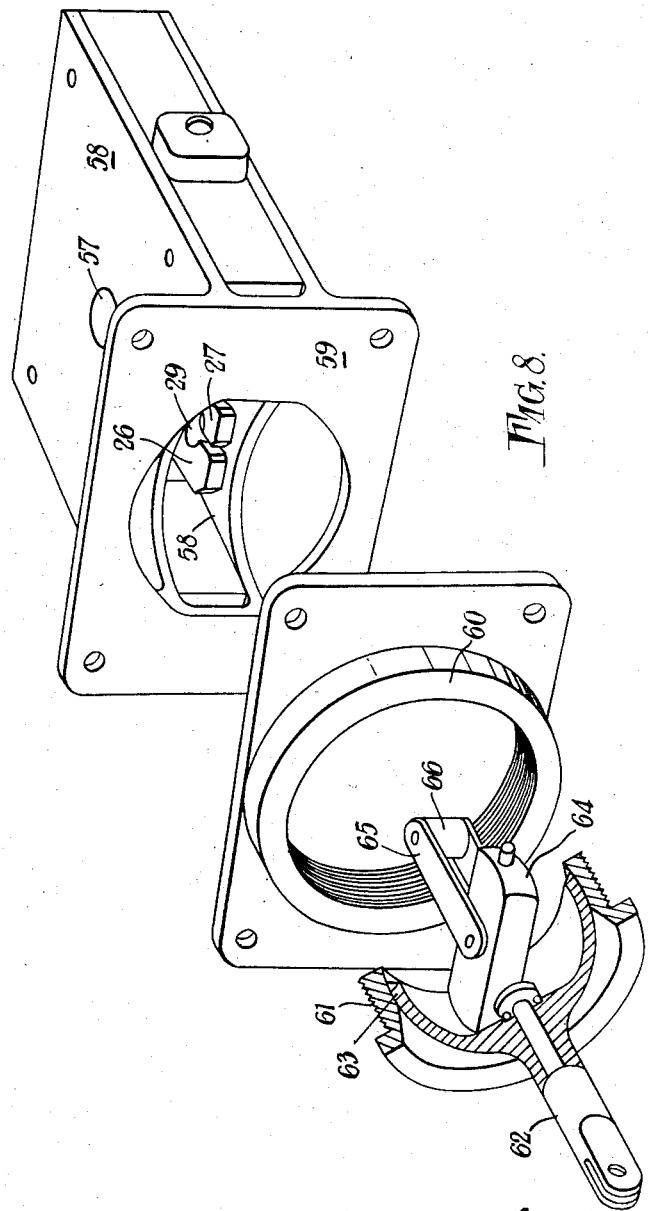

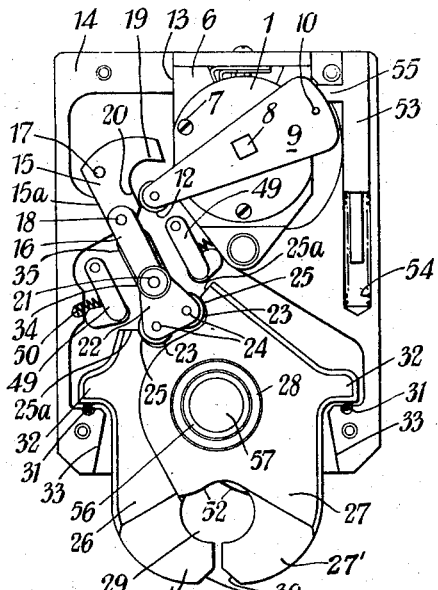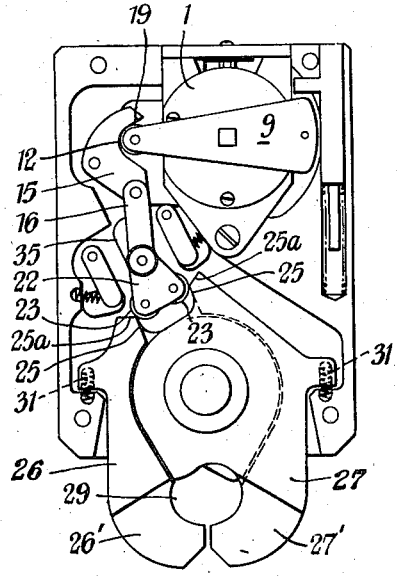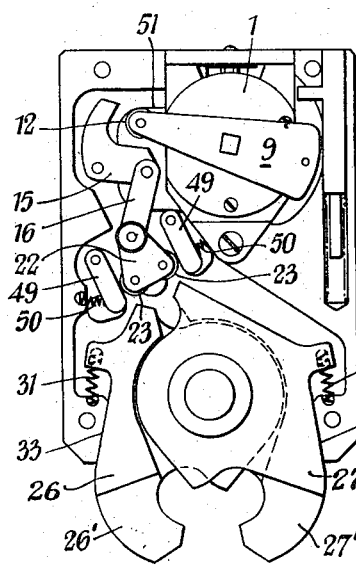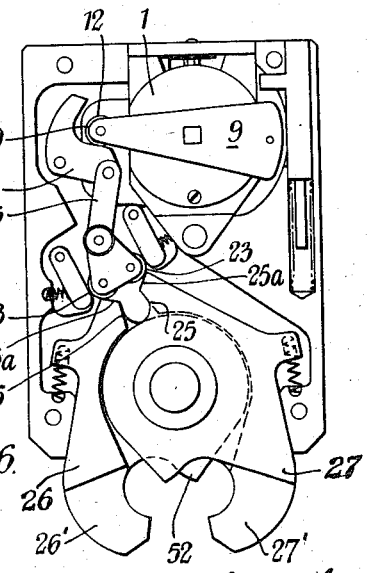

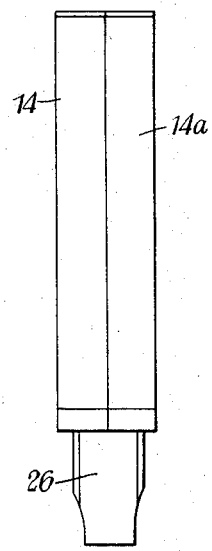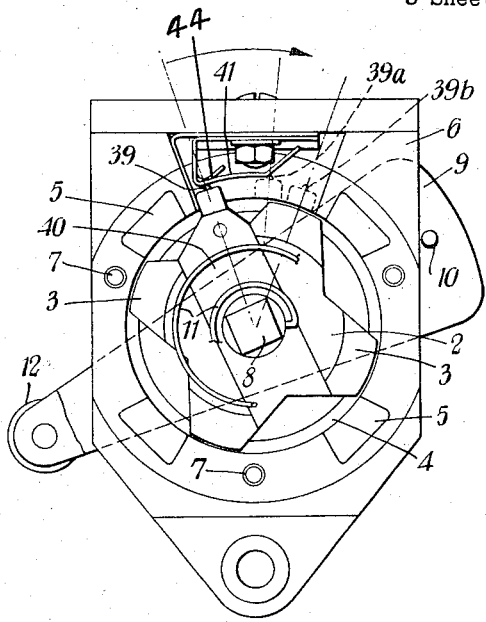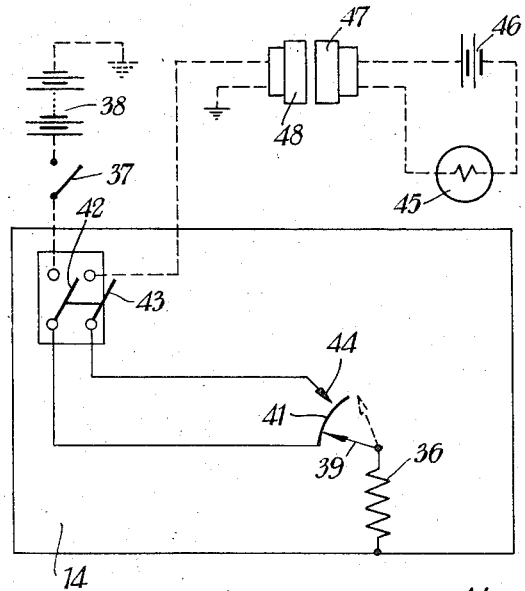

United States Patent Office 2,873,137
Patented Feb. 10, 1959

2,873,137

PARACHUTE AND LIKE RELEASE MECHANISM

Hugh Graham Conway and Kenneth Roy Sherhod, Belfast, Ireland, assignors to Short Brothers & Harland Limited, Belfast, Ireland Application May 29, 1956, Serial No. 588,177

Claims priority, application Great Britain June 6, 1955

6 Claims. (Cl. 294—83)

This invention concerns improvements relating to parachute-release mechanism and like releasable mechanism for use on aircraft. Mechanism hitherto utilized for the release of parachutes on aircraft has exhibited various deficiencies which the present invention seeks to obviate.

The invention is more particularly concerned with improvements in releasable mechanism of the kind, hereinafter referred to as the kind set forth, in which a pair of hooks is maintained in the closed position by a toggle linkage which, until deliberately released by operating means, holds roller means in locking engagement between members which carry said hooks of said pair.

According to the present invention, in mechanism of the kind set forth, the linkage-operating means is arranged to be balanced with respect to gravity and for axial loads and shocks. Indeed, the mechanism is advantageously arranged to be in complete or substantially complete inertia or mechanical balance and so that it is not subject to shock-produced acceleration loads which could have the effect of releasing the locking action.

Accordingly, in mechanism of the kind set forth, the operating means comprises an electric torque motor with a balanced rotor system and the linkage is arranged to be operated through cam means which, in the closed position of the hook device, positively locks the linkage against release. Thus an arm connected to the rotor of the torque motor may carry a roller engageable with cam surfaces on a link of the linkage, engagement with one cam surface locking the linkage against release and engagement with another cam surface serving to break and release the toggle linkage.

Preferably, the roller means held in locking engagement between surfaces on parts of the hook device comprises two rollers each in contact with a respective one of the said surfaces. By this means, sliding friction on these surfaces during the release movement can be eliminated and true rolling action ensured. Preferably also, the roller means or its pivotal connection to the toggle linkage is arranged to be positively guided during the release movement.

A preferred embodiment of the invention as applied to a parachute release mechanism will now be more fully described by way of example and with reference to the accompanying drawings, in which:

Figure 1 is a plan view of the release mechanism without the cover of its casing, Figure 2 is a side view of the said mechanism, Figure 3 is a view of the motor unit of the mechanism seen from the same direction as in Figure 1, but to a larger scale and with parts of the operating arm and motor broken away, Figure 4 is a circuit diagram, Figures 5, 6 and 7 are views similar to Figure 1, but to a smaller scale, illustrating the manner of operation of the mechanism, and Figure 8 is an exploded perspective view of a slip housing and associated parts.

In the arrangement to be described, the normal means for operating the release mechanism is an electric torque motor indicated generally at 1 in Figure 1. The motor illustrated is of a known type of construction with a steel rotor 2 (Figure 3) which carries the exciting winding (not seen) and which has a number of pole pieces, as shown four, in the form of outward radial projections 3 at its periphery. The stator consists of a cylindrical body 4 which encloses the rotor and which has inserted at its periphery a number of permanent magnets 5 corresponding to the stator pole pieces 3. The pole pieces 3 and the magnets 5 are arranged to be normally out of register (as they appear in Figure 3) when the motor is de-energised and to be attracted into register when it is energised. The stator is secured to a base plate 6 by screws 7. The rotor is fast on a shaft 8 to whose ends are fixed the two spaced parts 9 of a double radius arm which straddles the motor 1 and the base plate 6. At one end, the said parts 9 are held apart by a post 10 and at the other end by a pivot for a roller 12. The movement of the rotor and arm is suitably about 40° clockwise from the normal initial position shown in Figure 3 and is limited by abutments or stops. A concentric spiral spring 11 or springs anchored to the stator act on the rotor 2 and arm 9 to restore the same towards the initial position. The system comprising the said rotor and arm should be balanced statically as accurately as possible, so that it is balanced in itself with respect to the accelerations to which it is normally likely to be subjected. The motor 1 on the base plate 6 together with contact means hereinafter referred to forms a self-contained unit adapted for being received and secured in a recess 13 (Figure 1) in the casing 14 of the mechanism.

The roller 12 co-acts with steel cam formations on one link 15 of a toggle linkage 15, 16 which is in the extended dead-centre position (Figure 1) in the locked condition of the mechanism. The link 15 is pivotally mounted in the housing 14 at 17 and is pivotally connected to the twin link 16 at 18. The cam formations comprise a nose 19 projecting towards the motor 1, so that it will be engaged by the roller 12 and break the toggle linkage 15, 16 towards the roller upon clockwise turning of the rotor. The cam formations also comprise a surface 20 on the adjacent side of the link proper 15 which will be engaged by the roller 12 for returning the linkage 15, 16 towards the extended condition upon return movement of the rotor. The interaction between the roller 12 and cam formations is thus positive in both directions and is similar to the action in one slot of a Geneva motion. Furthermore, in the initial position of the rotor (Figure 1) the roller 12 positively prevents the linkage 15, 16 from breaking towards the roller. On the other side, the link 15 abuts against a surface 15a on the casing 14. The cam formations may be designed, as is indeed illustrated in Figure 1, so that the rotor can accelerate freely before the roller 12 engages the nose 19 and commences to produce releasing movement of the linkage. By this means, the rate of release and reliability of release for a given energising current can be increased. Moreover, the likelihood of wear on the locking-roller means hereinafter referred to can be reduced. The second link 16 of the toggle linkage is connected by a pivot pin 21 to one corner of a small triangular frame 22 in which hardened steel rollers 23 are mounted on pivots 24 at the other corners. In the locked condition of the mechanism, in which the linkage 15, 16 is extended, these rollers 23 are entered in a recess formed between heel surfaces 25 on respective hook members 26, 27 of the hook-carrying device.

The hook-carrying members 26, 27 are plate-shaped bodies of high tensile steel mounted by overlapping hub portions on a common journal formed by a large boss 28 in the casing 14. The free end portions of the hook-carrying members 26, 27 are shaped as hooks 26', 27' extending toward each other and are shaped to provide between them a circular opening 29 to receive a part connected to the parachute, such as the shackle roller 66 to be described with reference to Figure 8. The entry to the opening 29 may be bevelled on the outside, at 30, to facilitate introduction of the said part in the open condition of the device. The hook-carrying members 26, 27 are spring-loaded towards the open condition by helical compression springs 31 acting between lugs 32 on the said members and parts of the casing 14. The opening movement is limited by stop surfaces 33 in the said casing.

The toggle linkage 15, 16 is arranged so that it is in one line, when in the extended locking condition (Figure 1), with the centre of the journal 28 for the hook members 26, 27, that is the three pivots 17, 18, 21 of the linkage lie on that line. Moreover, the pivot 21 is guided for movement along the same line. For this purpose, the pivot pin is extended at both ends and carries rollers 34 guided in rectilinear slots 35 in the casing 14 and its cover. The surfaces 25 engaged by the locking rollers 23 are substantially parallel to the aforesaid line in the locked condition (Figure 1) of the hook device, so that any pressure on the said rollers in this condition is at right angles to the line of the extended toggle linkage 15, 16 and is fully balanced.

With the above-described arrangement, the mechanism is positively locked against release loads or shock-produced accelerations in all directions except, possibly, an acceleration in the clockwise direction about the centre of the torque motor 1, which would hardly be likely to occur upon an aircraft.

The rotor winding 36 (Figure 4) is energizable by closure of a manually operable remote-control switch 37 in series with a battery 38. If required, the battery and switch may be duplicated. Current is supplied to the winding through a wiping contact 39 which is carried by an arm 40 (Figure 3) fast on the rotor shaft 8 and which co-acts with an arcuate spring contact 41. As will be seen, the contacts 39, 41 are in engagement in the initial position of the rotor 2 and throughout all but the last part of its release movement. The contact 42 in this circuit and the contact 43 in a cocking-test circuit to be described represent safety contacts which are closed automatically only when the release mechanism is placed in the slip housing 58 hereinafter referred to in connection with Figure 8. The contact 43 is connected to a contact 44 which is engaged by the contact 39, or the contact 41, only when the rotor is in the initial position and the mechanism in the fully cocked condition, contact engagement being broken directly when the rotor 2 and contact 39 commence to move. The rest of the test circuit consists of an indicator lamp 45 and small battery 46 with which a continuity test can be carried out simply by inserting a plug 47 in a socket 48 at a convenient point. This arrangement affords a reliable check upon whether the mechanism is cocked and the necessity for a manual check is avoided.

The manner of operation of the release mechanism will now be briefly described with particular reference to Figures 1 and 5 to 7: Figure 1 illustrates the cocked condition of the mechanism. On energization of the motor 1 by a short closure of the switch 37 (Figure 4), assuming that the safety contact 42 is closed, the motor will commence to drive the arm 9 in a clockwise direction, causing the roller 12 to strike the cam surface 19 (Figure 5) and break the toggle linkage 15, 16, so that the rollers 23 are withdrawn from between the surfaces 25 and the hook-members 26, 27 become free to open under the influence of the springs 31 and to release the shackle roller 66. At about the same time and substantially simultaneously with the poles 3 coming into register with the poles 5, the contact 39 runs off the contact 41 (position 39a in Figure 3), so that the motor 1 becomes de-energised and the arm 9 is no longer power driven. Ejection of the rollers 23 from between the surfaces 25 is, however, assisted by the bevel surfaces 25a, so that the member 22 and links 15, 16 continue their motion towards the end position shown in Figure 6. In their final motion, the rollers 23 enter between pivotally mounted guide arms 49 loaded by springs 50. The arm 9, after being arrested by a stop surface 51 (the contact 39 reaching position 39b, Figure 3), is returned, by the action of the spring 11, to the position shown in Figure 7 in which the roller 12 abuts against the cam surface 20. Further return is prevented by the abutment of the rollers 23 against the surfaces 25a. The mechanism accordingly remains in the condition illustrated in Figure 7.

When the mechanism is next loaded, the engagement of the shackle roller 66 (Figure 8) with bevel surfaces 52 on the hook members 26, 27 will cause the hook members themselves to close on the said roller, while the heel surfaces 25 open to permit the locking rollers 23 to enter between them under the influence of the restoring spring 11 acting through the roller 12 and cam surface 20. It will thus be seen that the mechanism becomes cocked automatically on loading. Unless the mechanism is properly cocked, the hook members 26, 27 will not take the load at all.

Provision for alternative manual release of the mechanism is illustrated. It comprises a plunger 53 loaded by a compression spring 54 and having a finger 55 engageable with the post 10 of the arm 9. If the plunger 53 is moved downwardly of Figure 1, for example by a cable operated by a push button, the finger 55 will turn the arm 9 with substantially the same effect as has been described above for the power operation.

In addition to the recessed, plate-like, casing half 14, the casing has a similar cover half 14a (Figure 2). The boss 28 is provided with a bearing 56 for a single suspension pin 57 passing through the two casing halves 14, 14a and the boss 28. This casing is installed within an outer housing (Figure 8) comprising two plates 58 and a rearwardly facing end flange 59, the suspension pin 57 being mounted in the said plates. The housing is simply mounted in the aircraft structure and secured therein by four bolts. The arrangement described permits of all downward and fore and aft loads being taken directly into the aircraft structure without loading the casing.

Bolted to the end plate 59 is a flanged ring 60 which is internally threaded to receive a part-spherical, rearwardly open, seating 61 for an adaptor. The adaptor comprises a shackle 62 with a part-spherical member 63 located in the seating 61 and housing a universal swivel 64 by which it is connected to a forwardly extending twin link 65 carrying a roller 66 engageable in the opening 29 in the hook members 26, 27. This arrangement serves to take up any lateral components of loading due to the coning angle (an included angle of 120°) of the parachute, so that only tensional loads are passed to the hook device.

A practical advantage of the constructions described above is that precision investment castings of aluminium alloy can be employed for all the main elements, including the casing and housing, thus reducing machining to a minimum. However, the casing parts may be machined from the solid.

Various modifications may be made in the above-described mechanism: Instead of a simple nose 19 engaged by the roller 12 on the arm 9, the link 15 may be formed with a cam slot engaged by the said roller. A single roller may be provided, instead of two rollers 23, for locking the hook device. Particularly in this case, the toggle linkage may be actuated by the arm 9 through an additional toggle linkage which is also in the dead-centre condition and approximately at right angles to the first-named linkage when the mechanism is locked. In place of the torque motor 1, use may be made of aligned twin solenoids the adjacent ends of whose cores are connected by respective toggle links and a rectilinearly guided pivot to the frame 22 carrying the locking rollers 23. In this case, the two links lie in one line through the centres of the journal 28 and opening 29 of the hook members 26, 27 when the solenoids are de-energised, but are splayed apart to withdraw the said rollers when the solenoids are energised.

We claim:

1. Parachute and like release mechanism of the kind set forth comprising a housing, a pair of hook-carrying members in said housing pivotally mounted relative to each other and provided with hooks having free end portions extending toward each other at locations spaced from their respective pivots, whereby said hooks cooperate, in closed condition, to engage and hold an element to be released by the mechanism, said hook-carrying members each extending beyond their respective pivots opposite their hook ends and being formed on the oppositely extending portions with abutment walls facing each other, a toggle linkage mounted in said housing and having its links pivoted relatively to each other, roller means connected to one end of the said toggle linkage and engageable, when the said linkage is in its extended condition, between said opposed abutment walls on said hook-carrying members for locking the said hooks in the said closed position, an electromagnetic torque motor mounted in said housing adjacent said toggle linkage, a radius arm operatively connected to the said motor and rockable thereby between a position in which it is located substantially perpendicular to the plane containing the pivotal axes of said toggle-linkage when the said linkage is in the extended condition and in which the said arm engages the toggle linkage for holding the latter in the said extended condition and a position in which the said arm encounters one of the links of the linkage and acts to break the said linkage, thereby permitting opening of the hooks, the said radius arm being mechanically balanced about its axis, the said opposed abutment walls on said hook-carrying members being located substantially parallel to said plane when said hooks are in the said closed position so that any forces exerted on the said roller means by the said opposed abutment walls are substantially perpendicular to the said plane and fully balanced, whereby the mechanism is insensitive to forces, due to acceleration or shocks, liable to cause release of the hooks from the closed condition.

2. Mechanism according to claim 1, wherein said radius arm carries a roller and one of the links of the toggle linkage is provided with cam surfaces for co-operating with the said roller, engagement of the roller with one surface holding the said linkage against breaking and encounter with another surface serving to break the said linkage.

3. Mechanism according to claim 1, wherein guiding means is provided for affording to the roller means sliding guidance in the said plane when the said roller means is moved by the toggle linkage towards and away from locking engagement between the said opposed surfaces on the hook members.

4. Mechanism according to claim 1, wherein the rotor system of the torque motor carries sliding contact means through which the motor is energized, the said contact means being arranged to interrupt the energising circuit before the rotor system has reached the limit of its movement.

5. Mechanism according to claim 2, wherein the radius arm is arranged to turn freely for some distance before the roller on the said arm encounters the said second-named surface.

6. Mechanism according to claim 1, wherein the hook-carrying members are provided with formations having surfaces which, upon entry between the said members of the said part to be released, are engageable by the said part, the said surfaces being located so that such engagement causes the said members to close and permit the mechanism to become cocked automatically.

References Cited in the file of this patent

UNITED STATES PATENTS

| | | |
|---|---|---|
| 2,610,887 | Firman | Sept. 16, 1952 |
| 2,789,468 | Burns | Apr. 23, 1957 |

FOREIGN PATENTS

| | | |
|---|---|---|
| 699,588 | Germany | Dec. 3, 1940 |